UNITED STATES PATENT OFFICE.

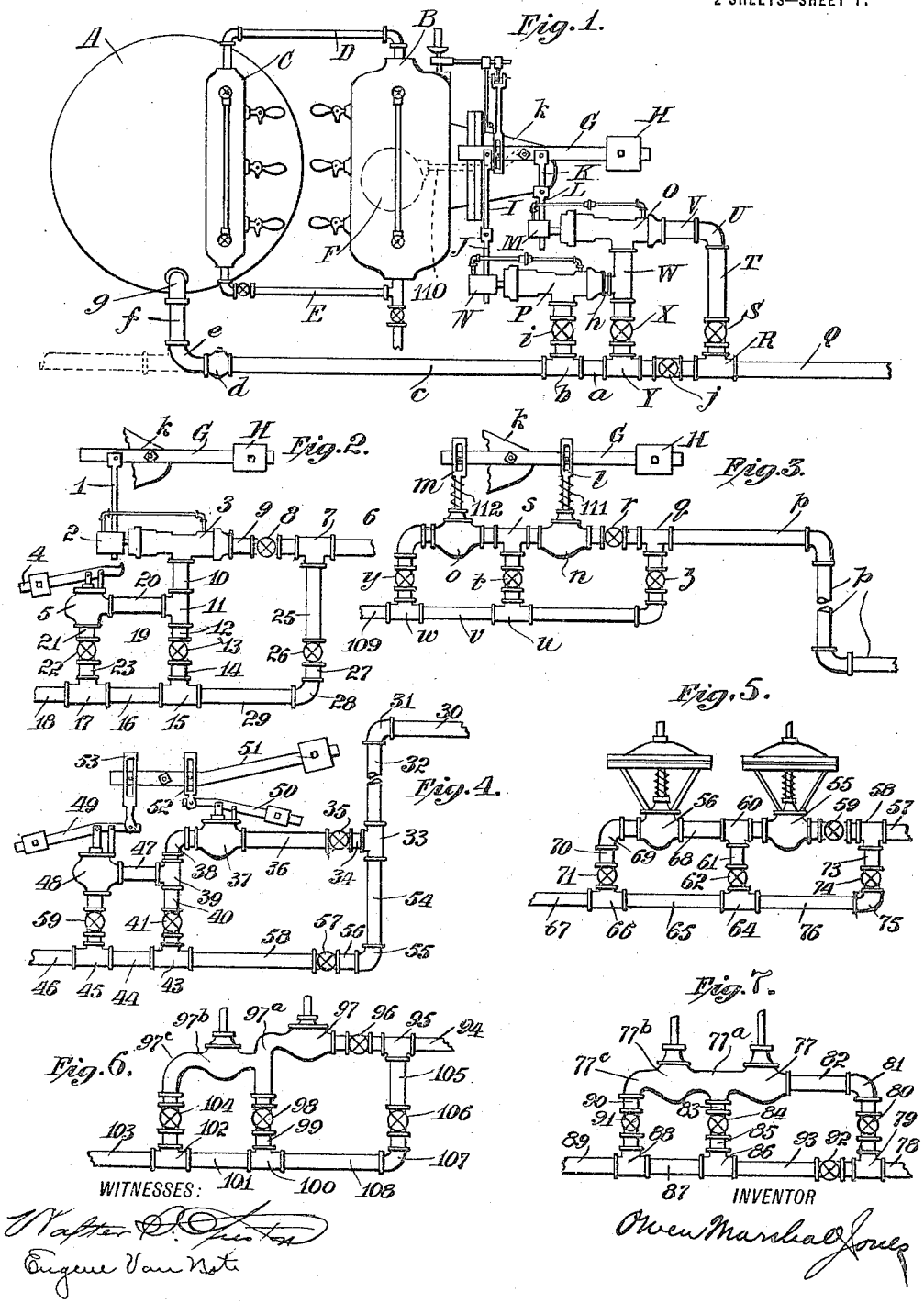

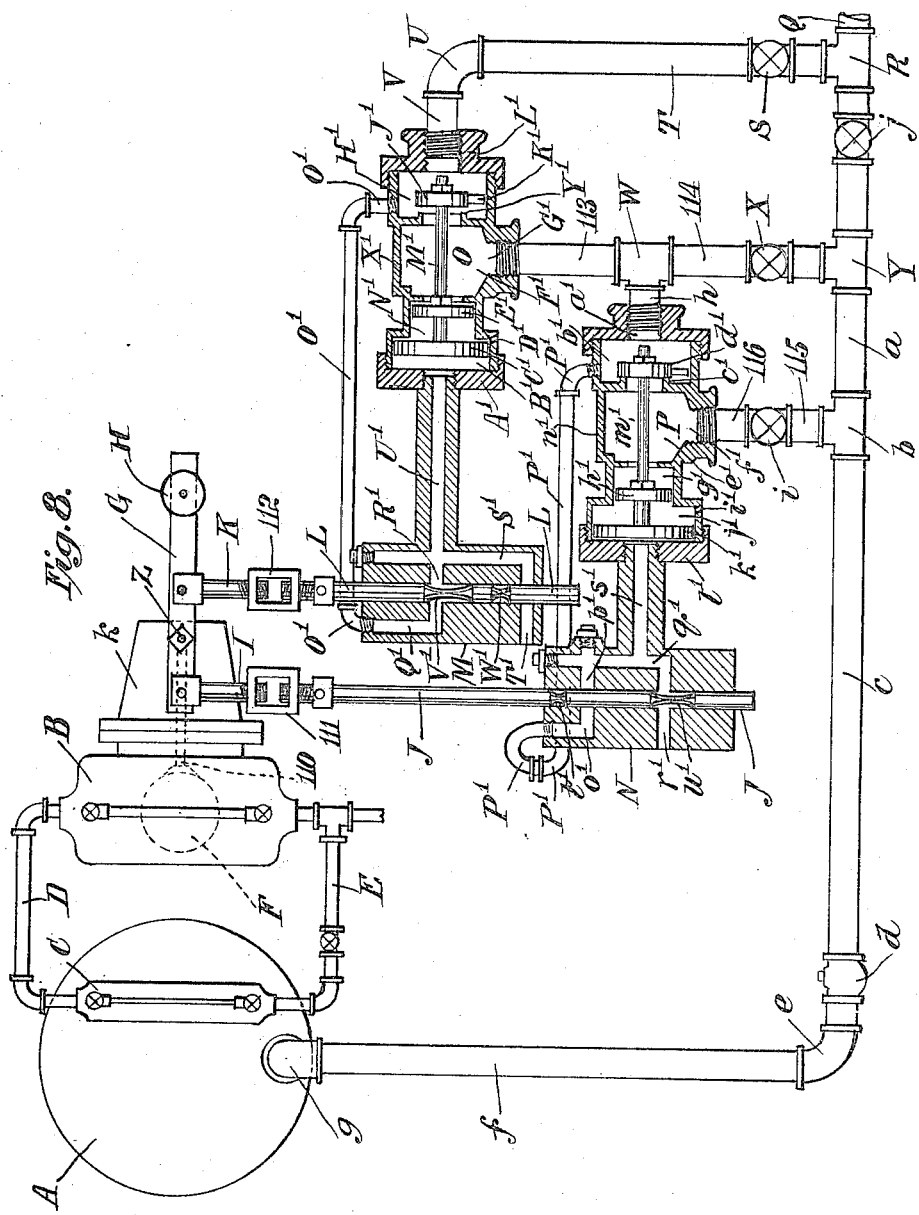

OWEN MARSHALL JONES, OF NEW YORK, N. Y.

SYSTEM FOR CONTROLLING THE LEVELS OF LIQUIDS.

1,227,540.  Specification of Letters Patent.  Patented May 22, 1917.

Application filed May 2, 1913.  Serial No. 765,177.

*To all whom it may concern:*

Be it known that I, OWEN MARSHALL JONES, a citizen of the United States, and a resident of the borough of Manhattan, city, county, and State of New York, have invented a certain new and useful System for Controlling the Levels of Liquids, of which the following is a specification, accompanied by drawings.

The invention relates to improved systems for controlling the levels of liquids in tanks, cylinders, boilers, or other forms of containers, by means of controlling the feed to the containers, although the invention may be used in any connection in which it is found applicable.

The objects of the invention are to improve upon and increase the ability and efficiency to control the levels of liquids and to hold as closely as possible the levels of liquids within a variation of levels as may be desired and within as small a variation of levels as may be possible.

Other objects of the invention are to obtain a continuous steady flow of liquids through a feed line to the containers, except at such times as the levels may reach an undesired or dangerous point when the feed to the containers would be cut off temporarily, or an excess amount of feed delivered to the containers.

Further objects of the invention are to insure against the levels reaching a point undesirable or dangerous about or below the mean level and thereby carrying out the function of a safety device.

Further objects of the invention are to arrange a system of feed connections to the containers so that the feed can be controlled at will by hand to maintain as nearly as possible a constant level when the liquids in the containers are being evaporated or drawn off during a steady consumption; when the consumption of liquids is unsteady and being consumed more rapidly than usual, due to many conditions which may arise, then an extra amount of liquid can be discharged into the container; when the liquids are not being consumed in the normal amount, then feed to the container can be obstructed to lessen the feed or closed to cut off the feed entirely; and to these ends the invention consists of an arrangement of apparatus, parts, and devices for carrying out the above objects embodied in a combination with valves, pipe or tubing, and fittings, having features of construction, combinations of elements, and arrangement of parts substantially as hereinafter fully described, and claimed in this specification and shown in the accompanying drawings, in which—

Figure 1 is a side elevation of a system embodying the invention.

Figs. 2 to 7 are side elevations of modifications.

Fig. 8 is a side elevation of a system embodying the invention and showing a cross section of valves O and P and pilot valves M and N.

Referring to the drawings, in Fig. 1, I have shown the parts and attachments of one form of the feed system and the means for automatically operating two of the valves, and the feed pipe connected to the container. I do not limit myself to the form of or construction of apparatus shown for operating the main valves, as many other forms or constructions of this portion of the system are applicable. A represents the container, which may be of any form. C represents a column which is attached at the back to container A at the top and bottom, details of connection not shown. B is a chamber attached to column C by pipe connections D and E, and the levels maintained in container A and column C are maintained in chamber B. Float F in chamber B is employed and rises and falls with the change in levels. A rod 110 extends from float F and is attached to a shaft in the extended chamber $k$, one end of the shaft being suitably held in place in the chamber, the other end of it protrudes through the side of chamber $k$, and is suitably held in place. To the protruding end of the shaft is attached lever G which partially rotates as float F rises or lowers. To lever G is attached rod I which lifts or pushes down stem J of a pilot valve in casing N; also to lever G is attached rod K which lifts or pushes down stem L of a pilot valve in casing M. O is a valve casing having a valve operated by the pilot valve in casing M. P is a valve casing having a valve operated by the pilot valve in casing N. Q is a portion of the feed pipe to the feed system. The liquid, flowing or being forced through pipe Q, enters the end of T connection R, valve $j$ being closed, and flows through the top outlet of the T R, through valve S, pipe T, L U, pipe V, valve casing O, T W, valve X, T Y, then through pipe a, T b, pipe c, check valve d, L e, pipe f, L g, and to the container A. Valve in casing O may be automatically held open in any suitable manner until the liquids rise to an undesired or dangerous point, when it is automatically closed, thus cutting off the feed to the container. The valve in casing O may be like that shown in my co-pending application Serial No. 765178, filed May 2, 1913. Valve X is operated at will by hand and set partly open to allow for the normal feed to the container. Should the liquid in the container be consumed more rapidly than under normal conditions and the level drops, then valve in casing P may be automatically held closed and in turn automatically opened. The valve in casing P may be like that shown in my co-pending application above referred to. The valve in casing P thus open, an extra quantity of the liquid or gas flows through the side outlet of T W, through pipe h, through valve in casing P, valve i, thence through T b to the container A. This performs the above operation, as will clearly be seen, to supply excess liquid when required and shuts off the flow of liquid to the container as desired. In case of repairs to any of the devices, apparatus, or parts placed above valves S, X, and i, then valves S, X, and i are closed and valve j is opened and allows direct feed through pipe Q, T R, valve j, T Y, pipe a, T b, pipe c, check valve d, L e, pipe f, L g to the container A.

I am not to be understood as limiting myself to the particular forms of fittings, valves, or other parts of the combination forming the system, as other forms may be used in accordance with my invention.

In Fig. 2, I have shown a modification of the combination of valves, pipe or tubing, and fittings as far as the arrangement of the devices, apparatus, and parts is concerned. For convenience, I show lever G to automatically operate the valve in casing 3 through a pilot valve in casing 2 by rod 1, which rod passing through valve casing 2 operates the lever 4 which in turn operates the valve in casing 5. In the construction shown in Fig. 2, the feed enters the pipe 6, through T 7, valve 8, pipe 9, valve casing 3, pipe 10, T 11, pipe 12, valve 13, pipe 14, T 15, pipe 16, T 17, pipe 18, and thence to the container, valve 13 being set at will by hand to control the normal feed. The valves in casings 3 and 5 operate in a manner and for the purposes similar to valves in casings O and P in Fig. 1. Valve 26 is operated for the same purposes as valve j in Fig. 1. Valves 8 and 13 and 22 are operated for the same purposes as described for valves S, X, and i in Fig. 1. Valve in casing 3 is automatically held open until the level in the container reaches a dangerous high point when said valve is automatically closed, cutting off the feed. Valve in casing 5, which is normally held closed by the weight on lever 4, is automatically opened to allow an excess feed when the liquid falls to an undesired or dangerous point. Valve in casing 5 thus being opened, allows an excess feed to pass through the side outlet of T 11, through pipe 20, valve in casing 5, pipe 21, valve 22, pipe 23, T 17, and through pipe 18 to the container. By closing valves 8, 13, and 22 for purposes which may be desired, then there is a direct feed through bottom outlet of T 7, pipe 25, valve 26 which has to be opened, pipe 27, L 28, pipe 29, T 15, pipe 16, T 17, and through pipe 18 to the container.

In Fig. 3, I have shown a modification of the combination of valves, pipe or tubing, and fittings as far as the arrangement of the devices, apparatus, and parts is concerned. For convenience, I show lever G to automatically operate valves in casings n and o, the valve in casing n being held open by a spring 111 on the stem 1, valve in casing o being held closed by the spring 112 on the stem m. When the end of lever G, to which is attached weight H lowers, it closes valve in casing n. When the opposite end of lever G lowers, it opens valve in casing o. The feed is through pipe p, T q, valve r, valve n, T s, valve t, T u, pipe v, T w, and pipe 109 to the container. The valve r is operated in the same manner and for the same purpose as valve S in Fig. 1. Valves z, t, and y operate in the same manner and for the same purposes as valves j, X, and i in Fig. 1. The valves n and o are automatically operated for the same purposes as valves O and P in Fig. 1.

In Fig. 4, I have shown a modification of the combination of valves, pipe or tubing, and fittings as far as the arrangement of devices, apparatus, and parts is concerned. For convenience for operating valves in casings 37 and 48, I show lever 51 which operates valve in casing 37 in combination with link 52 and lever 50; lever 51 operates valve in casing 48 through link 53 and lever 49. The valve in casing 37 is held open by the weight on lever 50, and valve in casing 48 is held closed by the weight on lever 49, and are reverse in action or operation similar to valves in casings O and P in Fig. 1. In this modification, the feed enters at pipe 30, through L 31, pipe 32, T 33, pipe 34, valve 35, pipe 36, valve 37, L 38, T 39, pipe 40, valve 41, T 43, pipe 44, T 45, pipe 46 to the container. The feed is cut off from valve in casing 37 and the excess feed passes through valve in casing 48, similar to valves in casings O and P in Fig. 1. Valve 35 is operated in the same manner and for the same purpose as valve S in Fig. 1. Valves 57, 41, and 59 are operated in the same manner and for the same purposes as valves j, X, and i in Fig. 1.

In Fig. 5, I have shown a modification of the combination of valves, pipe or tubing, and fittings, as far as arrangement of devices, apparatus, or parts is concerned. For convenience, I show the two main valves in casings 55 and 56 of the type of valves operated by diaphragm and spring. They perform the same functions as described for valves in casings O and P in Fig. 1. In this modification, the feed enters at pipe 57, through T 58, valve 59, valve 55, T 60, pipe 61, valve 62, T 64, pipe 65, T 66, and then through pipe 67 to the container. Valve 59 is operated for the same purpose and in the same manner as valve S in Fig. 1. Valves 74, 62, and 71 are operated for the same purposes and in the same manner as valves j, X, and i in Fig. 1.

In Fig. 6, I have shown a modification of the combination of valves, pipe or tubing, and fittings, as far as arrangement of devices, apparatus, and parts is concerned. I show in one piece or body the chambers for the two main valves the ports connecting the two chambers, and the inlets to and outlets from the chambers, 97, 97ª, 97ᵇ, and 97ᶜ. The two valves in this piece operate automatically and for the same purposes as valves in casings O and P in Fig. 1. In this modification, the feed enters at pipe 94, through T 95, valve 96, valve in casing 97, valve 98, pipe 99, T 100, pipe 101, T 102, and then through pipe 103 to the container. Valve 96 is operated by the same means and for the same purpose as valve S in Fig. 1. Valves 106, 98, and 104 operate by the same means and for the same purposes as valves j, X, and i in Fig. 1.

In Fig. 7, I have shown a modification of the combination of valves, pipe or tubing, and fittings as far as arrangement of devices, apparatus, and parts is concerned. I show in one piece or body the chambers for the two main valves, the port connecting the two chambers, and the inlets to and outlets from the chambers, 77, 77ª, 77ᵇ, and 77ᶜ. The two valves in this piece operate automatically and for the same purposes as valves in casings O and P in Fig. 1. In this modification, the feed enters at pipe 78, through T 79, valve 80, L 81, pipe 82, valve in casing 77, pipe 83, valve 84, pipe 85, T 86, pipe 87, T 88, and then through pipe 89 to the container. Valve 80 operates by the same means and for the same purposes as valve S in Fig. 1. Valves 92, 84, and 91 are operated by the same means and for the same purposes as valves j, X, and i in Fig. 1.

In Fig. 8, I have shown the parts and attachments of one form of the systems for controlling the feed, and the means for automatically operating two of the valves. The form of the system shown in this figure is the same as shown in Fig. 1 so far as the general arrangement of parts, but it shows the cross sections of valves O and P and cross sections of pilot valves M and N. A represents the container, which may be of any form. C represents a column which is attached at the back to container A at the top and bottom, details of connection not shown. B is a chamber attached to column C by pipe connections D and E, and the levels maintained in container A and column C are maintained in chamber B. Float F in chamber B is employed and rises and falls with the change in levels. A rod 110 extends from float F and is attached to a shaft Z in the extended chamber K, one end of the shaft being suitably held in place in the chamber, the other end of it protrudes through the side of chamber k, and is suitably held in place. To the protruding end of the shaft is attached lever G which partially rotates as float F rises or lowers. To lever G is attached rod I which lifts or pushes down stem J of a pilot valve N; also to lever G is attached rod K which lifts or pushes down stem L of a pilot valve M. O is a valve operated by the pilot valve M. P is a valve operated by the pilot valve N. Q is a portion of the feed pipe to the feed system.

Referring to valve O, X' is the valve casing, L' is the inlet head, H' is the inlet chamber, J' is a valve disk, Y' is the valve seat, F' is the discharge chamber, G' is the outlet, E' is a piston which is of a diameter larger than diameter of the valve disk, D' is an air vent or drip, C' is a piston which is of a diameter with an area greater than the combined areas of the piston E' and the valve disk J', B' is a piston chamber, A' is the head of piston chamber B', O' is the by-pass from the inlet chamber to the pilot valve M, M' is a rod on which the valve disk J' and the pistons E' and C' are attached in their respective positions and they have a reciprocating movement. When the stem L in pilot valve M is raised the cut-out section V' of the stem L registers with the ports Q' and R' thereby allowing the liquid coming through the by-pass to flow through the port U' and into the piston chamber B' and forces the piston C' away from the head A', thereby moving the valve disk J' from its seat which permits the liquid to pass through the opening in the seat then into the discharge chamber F' and through the outlet G' and into the pipe 113. When the stem L lowers the cut-out section V' moves out of register with the ports Q' and R' which cuts off the flow through those two ports, then the cut-out section W' in the stem L registers with the ports S' and T' and forms an exhaust outlet from the port U' and thereby relieves the pressure on the piston C' and the back pressure in the discharge chamber F' of the valve O acts on the piston E' and forces it away from the discharge chamber and moves the valve disk J' to its seat Y' thereby closing the valve and holding it closed.

Referring to valve P, the by-pass P', the rod $m'$, the valve disk $d'$, and the pistons $h'$ and $k'$ perform the same functions as the parts of valve O to which they are similar. The pilot valve N attached to the valve P performs functions similar to the functions performed by the pilot valve M. When stem J is raised the cut-out section $u'$ registers with the ports $r'$ and $q'$ thereby forming an exhaust outlet from the port $s'$ which will relieve the pressure on the piston $k'$ and the back pressure in the discharge chamber $e'$ of the valve P acts on the piston $h'$ and forces it away from the discharge chamber and moves the valve disk $d'$ to its seat $c'$ thereby closing the valve and holding it closed. When the stem J is lowered the cut-out section $t'$ registers with the ports $o'$ and $p'$ thereby allowing the liquid coming through the by-pass P' to flow through the port $s'$ and into the piston chamber $j'$ and forces the piston $k'$ away from the head $l'$ and moves the valve disk $d'$ from its seat $c'$ which permits the liquid to pass through the opening in the seat then into the discharge chamber $e'$ and through the outlet $f'$ and into the pipe 116.

The cut-out section V' in the stem L of the pilot valve M and the cut-out section $u'$ in the stem J of the pilot valve N are made of the length required to operate the valves according to the desired lowest or highest level the liquid is to reach before an excess amount of feed is to be supplied or the supply is to be entirely cut off.

The turnbuckles 111 and 112 are for adjusting the stems J and L respectively, so as to set the cut-out sections in the stems relative to the ports with which the cut-out sections register.

Say the container is empty, then valves $i$, X and S are closed and valve $j$ is opened, and the liquid is forced through pipe Q, valve $j$, fittings Y, pipe $a$, fitting $b$, pipe $c$, and on to the container until the liquid rises to the mean level desired then float F and lever G will be at the position shown. Then close valve $j$, open valves $i$, X and S then the liquid will be forced through valve S, pipe T, fitting U, pipe V, into the chamber H' of the valve O and flows through the by-pass O' to the port Q' of the pilot valve M and around the cut-out section V' of the stem L, then through the ports R' and U' into the piston chamber B' of the valve O, then against the piston C'. The pressure thus exerted against the piston C' pushes that piston and the piston E' and the valve disk J' toward the inlet end of the valve O, thereby moving the valve disk J' from the seat Y' and permits the liquid to pass through the opening in the seat, then through the chamber F', outlet G', pipe 113, T W, pipe 114, valve X, fitting Y, then through pipe $a$, T $b$, pipe $c$, check valve $d$, L $e$, pipe $f$, and L $g$ to the container A. Valve X is operated at will by hand and set partly open to allow for the feed to the container to maintain the mean level desired when there is the normal consumption of the liquid. The liquid has also flowed up through the top outlet of fitting $b$, pipe 115, valve $i$, pipe 116, and into discharge chamber of the valve P, and the pressure of liquid against the piston $h'$ holds valve disk $d'$ against the seat $c'$. At the same time the liquid has flowed through the side outlet of fitting W and into the chamber $b'$ of valve P, and passes through the by-pass P' to the port $o'$ in pilot valve N. When there is a fall of the level of the liquid in the container the float F lowers and end of the lever G to which is attached the rod I also lowers, then the stem J lowers and the cut-out section $t'$ of the stem J registers with the ports $o'$ and $p'$ and permits the liquid to pass through the ports $s'$ to the piston chamber $j'$ of the valve P then against the piston $k'$. The pressure thus exerted against the piston $k'$ pushes that piston with the piston $h'$ and the valve disk $d'$ toward the inlet end of the valve P, thereby moving the valve disk $d'$ from the seat $c'$ and permits the liquid to pass through the opening in the seat, then through the chamber $e'$, outlet $f'$, pipe 116, valve $i$, pipe 115, T $b$, pipe $c$, check valve $d$, L $e$, pipe $f$ and L $g$ to the container A, this action thereby forming a by-pass around valve X and gives an auxiliary feed to supply liquid in excess of the amount passing through valve X which was set partly open to allow for the quantity of feed to the container required for normal consumption.

The above operations show the system as an automatically controlled feed to a container. If the person responsible for watching the gage glass and seeing that a mean level is obtained in the container (this person is commonly called a "tender") will regulate the valve X by hand and thereby maintain a mean level, the valve O will always remain open, and the valve P will always remain closed. Then in the latter case the system will assume the duties of a safety device should the tender fail to regulate the feed by hand through the valve X. If the tender should open the valve X wider to pass an amount of feed in excess of normal requirements, and the consumption of the liquid should fall to normal, and the tender failed to partly close the valve X, then the liquid would rise above the mean level and the valve O would operate automatically and shut off the entire supply until the level falls near mean level.

On the other hand if the consumption of liquid from the container should fall below normal and the tender should regulate the valve X to further reduce the amount of liquid passing through it, and then the normal consumption should again prevail, and the tender failed to open the valve X wider, then the liquid would fall below the mean level and valve P would operate automatically and allow an excess amount of feed to pass to the container.

Obviously, some features of this system or construction may be used without others, and my invention may be embodied in widely varying forms.

Therefore, without limiting myself to the construction and arrangement and combinations of parts as shown and described, and without limiting myself to any particular form or type of valves or other parts forming the combination, nor without enumerating equivalents,

I claim and desire to obtain by Letters Patent the following:—

1. In a system of controlling the feeding of fluid to containers from which the fluid is consumed, the combination with a container, of means for automatically controlling the starting and stopping of the feed, manual means for controlling the amount of feed located between the container and the automatic means for starting and stopping the feed, and auxiliary automatic means for controlling and delivering fluid in excess of the normal amount required in the container.

2. In a system of controlling the feeding of fluid to containers from which the fluid is consumed, the combination with a container, of means for automatically controlling the starting and stopping of the feed, means for restricting the flow to the container located between the container and the means for automatically controlling the starting and stopping of the feed, and auxiliary automatic means for controlling and delivering fluid in excess of the normal amount required in the container.

3. In a system of controlling the feeding of fluid to containers from which the fluid is consumed, the combination with a container, of two automatic valves controlling the feed, one for controlling the starting and stopping of the feed, and the other for controlling the excess of fluid required.

4. In a system of controlling the feeding of fluid to containers from which the fluid is consumed, the combination with a container, of two automatic valves controlling the feed, one for controlling the starting and stopping of the feed, and the other for controlling the excess of fluid required, and manual means for controlling the amount of feed located between the container and the said two automatic valves.

5. In a system of controlling the feeding of fluid to containers from which the fluid is consumed, the combination with a container, of a feed pipe for feeding fluid directly to the container, a by-pass from one point of the feed pipe to another succeeding point in the feed pipe, an automatically operated valve located in the by-pass to control the starting and stopping of the feed when the passage through the direct feed pipe is cut off between the points at which the by-pass connects with the direct feed pipe, and manual means located in the said by-pass between the container and the automatic means for starting and stopping the feed for regulating the amount of feed through the by-pass.

6. In a system of controlling the feeding of fluid to containers from which the fluid is consumed, the combination with a container, of a feed pipe for feeding fluid directly to the container, a primary by-pass from one point of the feed pipe to another succeeding point in the feed pipe, a secondary by-pass from the primary by-pass to a further succeeding point in the feed pipe, and a manual means located in each by-pass for regulating the amount of feed through the said by-passes.

7. In a system of controlling the feeding of fluid to containers from which the fluid is consumed, the combination with a container, of a feed pipe for feeding fluid directly to the container, a primary by-pass from one point of the feed pipe to another succeeding point in the feed pipe, an automatically operated valve located in the primary by-pass to control the starting and stopping of the feed when the passage through the direct feed pipe is cut off between the points at which the primary by-pass connects with the feed pipe, manual means located in the primary by-pass beyond the automatically operated valve in said by-pass to regulate the amount of flow through the by-pass as desired, a secondary by-pass from the primary by-pass to a further succeeding point in the feed pipe, and an automatically operated valve located in the secondary by-pass to control the feeding of an excess of fluid when the said manual means restricts the flow through the primary by-pass.

8. In a system of controlling the feeding of fluid to containers from which the fluid is consumed, the combination with a container, of a feed pipe for feeding fluid directly to the container, a primary by-pass from one point of the feed pipe to another succeeding point in the feed pipe, an automatically operated valve located in the primary by-pass to control the starting and stopping of the feed when the passage through the direct feed pipe is cut off between the points at which the primary by-pass connects with the feed pipe, manual means located in the primary by-pass beyond the automatically operated valve in the said by-pass to regulate the amount of flow through the by-pass as desired, a secondary by-pass from the primary by-pass to a further succeeding point in the feed pipe, an automatically operated valve located in the secondary by-pass to control the feeding of an excess of fluid when the said manual means restricts the flow through the primary by-pass, and manual means located in the secondary by-pass beyond the automatically operated valve in said by-pass to regulate the amount of flow through the secondary by-pass as desired.

9. In a system of controlling the feeding of fluid to containers from which the fluid is consumed, the combination with a container, of a feed pipe for feeding fluid directly to the container, a primary by-pass from one point of the feed pipe to another succeeding point in the feed pipe, an automatically operated valve located in the primary by-pass to control the starting and stopping of the feed when the passage through the direct feed pipe is cut off between the points at which the primary by-pass connects with the feed pipe, manual means located in the primary by-pass beyond the automatically operated valve in the said by-pass to regulate the amount of flow through the by-pass as desired, a secondary by-pass from the primary by-pass to a further succeeding point in the feed pipe, an automatically operated valve located in the secondary by-pass to control the feeding of an excess of fluid when the said manual means restricts the flow through the primary by-pass, manual means located in the secondary by-pass beyond the automatically operated valve in said by-pass to regulate the amount of flow through the secondary by-pass as desired, and manual means located in the direct feed pipe between the points at which the primary by-pass connects with the direct feed pipe for diverting the flow through the said by-pass when automatic feeding is desired.

10. In a system of controlling the feeding of fluid to containers from which the fluid is consumed, the combination with a container, of a feed pipe for feeding fluid directly to the container, a primary by-pass from one point of the feed pipe to another succeeding point in the feed pipe, an automatically operated valve located in the primary by-pass to control the starting and stopping of the feed when the passage through the direct feed pipe is cut off between the points at which the primary by-pass connects with the feed pipe, manual means located in the primary by-pass beyond the automatically operated valve in the said by-pass to regulate the amount of flow through the by-pass as desired, a secondary by-pass from the primary by-pass to a further succeeding point in the feed pipe, an automatically operated valve located in the secondary by-pass to control the feeding of an excess of fluid when the said manual means restricts the flow through the primary by-pass, manual means located in the secondary by-pass beyond the automatically operated valve in said by-pass to regulate the amount of flow through the secondary by-pass as desired, manual means located in the direct feed pipe between the points at which the primary by-pass connects with the direct feed pipe for diverting the flow through the said by-pass when automatic feeding is desired, and manual means located in the primary by-pass between the direct feed pipe and the automatically operated valve in said by-pass for cutting off the flow in said by-pass as desired.

11. In a system of controlling the feeding of fluid to containers from which the fluid is consumed, the combination with a container, of a feed pipe for feeding fluid directly to the container, a primary by-pass from one point of the feed pipe to another point in the feed pipe, a secondary by-pass from the primary by-pass to a point in the feed pipe, and a manual means located in each by-pass for regulating the amount of feed through the said by-passes.

12. In a system of controlling the feeding of fluid to containers from which the fluid is consumed, the combination with a container, of a feed pipe for feeding fluid directly to the container, a primary by-pass from one point of the feed pipe to another point in the feed pipe, an automatically operated valve located in the primary by-pass to control the starting and stopping of the feed through the by-pass, manual means lolated in the primary by-pass beyond the automatically operated valve in said by-pass to regulate the amount of flow through the by-pass as desired, a secondary by-pass from the primary by-pass to a point in the feed pipe, and an automatically operated valve located in the secondary by-pass to control the feeding of an excess of fluid when the said manual means restricts the flow through the primary by-pass.

13. In a system of controlling the feeding of fluid to containers from which the fluid is consumed, the combination with a container, of a feed pipe for feeding fluid directly to the container, a primary by-pass from one point of the feed pipe to another point in the feed pipe, an automatically operated valve located in the primary by-pass to control the starting and stopping of the feed through the by-pass, manual means located in the primary by-pass to regulate the amount of flow through the by-pass as desired, a secondary by-pass from the primary by-pass to a point in the feed pipe, an automatically operated valve located in the secondary by-pass to control the starting and stopping of the feed through said by-pass, manual means located in the secondary by-pass to regulate the amount of flow through the secondary by-pass as desired, manual means located in the direct feed pipe for diverting the flow through the said by-passes when desired, and manual means located in the by-passes between the direct feed pipe and the automatically operated valves in said by-passes for cutting off the flow through said by-passes as desired.

14. In a system of controlling the feeding of fluid to containers from which the fluid is consumed, the combination with a container, of a feed pipe for feeding fluid directly to the container, a primary by-pass from one point of the feed pipe to another point in the feed pipe, an automatically operated valve located in the primary by-pass to control the starting and stopping of the feed through the by-pass when the passage through the direct feed pipe is cut off between the points at which the primary by-pass connects with the feed pipe, manual means located in the primary by-pass beyond the automatically operated valve in the said by-pass to regulate the amount of flow through the by-pass as desired, a secondary by-pass from the primary by-pass to a point in the feed pipe, an automatically operated valve located in the secondary by-pass to control the feeding of an excess of fluid when the said manual means restricts the flow through the primary by-pass, manual means located in the secondary by-pass beyond the automatically operated valve in said by-pass to regulate the amount of flow through the secondary by-pass as desired, manual means located in the direct feed pipe between the points at which the primary by-pass connects with the direct feed pipe for diverting the flow through the said by-pass when automatic feeding is desired, and manual means located in the primary by-pass between the direct feed pipe and the automatically operated valve in said by-pass for cutting off the flow in said by-pass as desired.

15. In a system of controlling the feeding of fluid to containers from which the fluid is consumed, the combination with a container, of means for automatically controlling the starting and stopping of the feed, manual means for controlling the amount of feed located between the container and the automatic means for starting and stopping the feed, and auxiliary automatic means for controlling the feed of the fluid in excess of the normal amount required in the container.

16. In a system of controlling the feeding of fluid to containers from which the fluid is consumed, the combination with a container, of means for automatically controlling the starting and stopping of the feed, means for restricting the flow to the container located between the container and the automatic means for starting and stopping the feed, and auxiliary automatic means for controlling the feed of fluid in excess of the normal amount required in the container.

In testimony whereof I have signed this specification in the presence of two subscribing witnesses.

OWEN MARSHALL JONES.

Witnesses:
GEORGE H. JEWELL,
JAMES S. HARTNETT.

Copies of this patent may be obtained for five cents each, by addressing the "Commissioner of Patents, Washington, D. C."